United States Patent [19]

Peyronny

[11] Patent Number: 5,872,888
[45] Date of Patent: Feb. 16, 1999

[54] ELECTRIC RADIATOR WITH A HEATING BODY EMBEDDED IN A LIGHT ALLOY UNIT

[76] Inventor: Bernard Peyronny, Mas de la Fauvette, Chemin du Trentin, 84250 Le Thor, France

[21] Appl. No.: 750,471

[22] PCT Filed: Jun. 13, 1996

[86] PCT No.: PCT/FR95/00772

§ 371 Date: Dec. 13, 1996

§ 102(e) Date: Dec. 13, 1996

[87] PCT Pub. No.: WO95/34787

PCT Pub. Date: Dec. 21, 1995

[30] Foreign Application Priority Data

Jun. 15, 1994 [FR] France ................................. 9407678

[51] Int. Cl.⁶ .................................................. F24H 7/00
[52] U.S. Cl. ...................... 392/346; 392/344; 392/553; 219/375
[58] Field of Search .................................... 392/346, 344, 392/553; 219/375, 365, 544

[56] References Cited

U.S. PATENT DOCUMENTS

| | | | |
|---|---|---|---|
| 4,636,616 | 1/1987 | Elg | 219/365 |
| 4,899,032 | 2/1990 | Schwarzl | 219/375 |
| 5,042,081 | 8/1991 | Steffes | 292/344 |
| 5,641,421 | 6/1997 | Manov | 219/553 |

FOREIGN PATENT DOCUMENTS

| | | |
|---|---|---|
| 2172761 | 10/1973 | France . |
| 2220004 | 7/1974 | France . |
| 1765962 | 4/1972 | Germany . |
| 9108529 | 11/1991 | Germany . |
| 2162028 | 1/1986 | United Kingdom . |

*Primary Examiner*—Teresa J. Walberg
*Assistant Examiner*—Quan Nguyen
*Attorney, Agent, or Firm*—Greenblum & Bernstein, P.L.C.

[57] ABSTRACT

The present invention relates to an electric radiator. A heating body, made of a resistive element embedded in a light alloy unit, is housed in an enclosure. The enclosure and heating body are separated by stiffening elements to surround the heating body with an air space. Heat is controlled by cutting power to the heating body during a variable time interval.

12 Claims, 1 Drawing Sheet

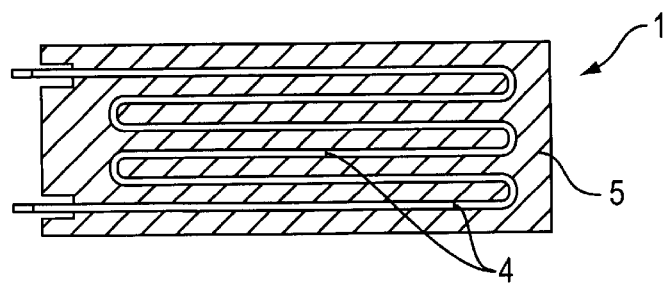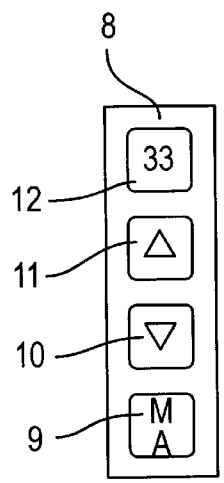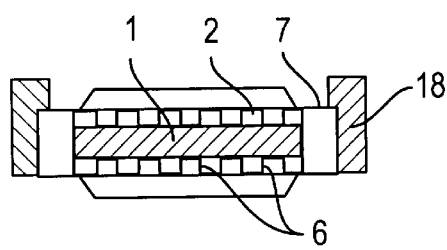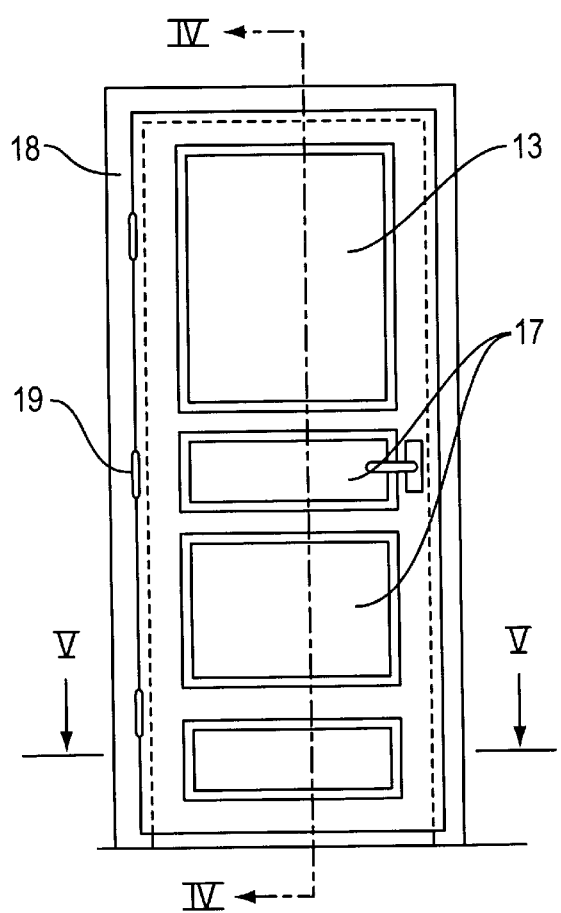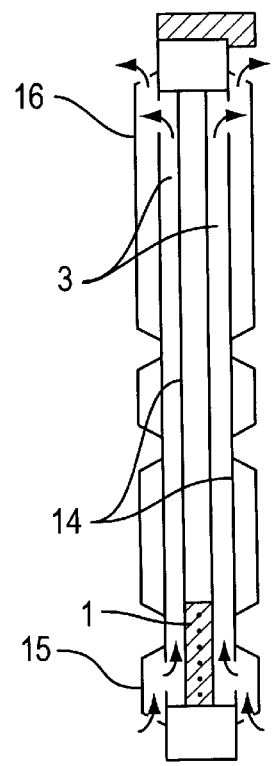

ELECTRIC RADIATOR WITH A HEATING BODY EMBEDDED IN A LIGHT ALLOY UNIT

BACKGROUND OF THE INVENTION

1. Field of the Invention

The present invention relates to an electric radiator having a heating body embedded in a light alloy unit.

2. Background and Material Information

The present invention acts as either a primary or supplemental heat source for all types of environments, including apartments, houses, offices, stores, or other private or professional premises.

Under the current design of heating systems, it is difficult to control and optimize energy consumption in large installations. As a result, self-contained individual units have become the preferred method of heat over central heating systems, except for hospitals and hotels.

The three most commonly used sources of energy for heating systems are fuel oil, gas and electricity. Electricity has numerous advantages over the other two, including versatility, cleanliness, comfort, ease of adjustment and programming, low investment, etc.; however, the cost of electric power is substantially higher than the other two types of energy. This has motivated the development of "integrated heating", which utilizes electric heaters in an environment which is insulated properly. Specifically, in order to save energy, new buildings are well-insulated, and electricity is the preferred source of energy to provide heat.

Heating units are generally in the form of radiator units which include a casing of metal provided with an inlet and outlet for air passage. A single electric resistance, which is often associated with wings or baffles, increases the heat exchange surface and/or directs the air flow. The control mechanism is typically a thermostat integrated in the unit, although more developed systems may be used, such as a zone thermostat, exterior thermostat, programming or power cut-off device.

Current electric radiators have two particular disadvantages.

First, the control is typically an on-off control between two nearly equal temperatures ("differential"). In this design, the heat source is alternately shut-off and cold, then connected at its maximum temperature. Recent studies have shown that the "impression" of the heat does not "feel" like the preferred temperature, but rather makes the heated environment feel closer to the lower temperature. As a result, users often set the thermostat several degrees above the desired temperature, wasting a significant amount of electricity.

Second, while numerous public awareness campaigns encourage saving energy, most people who have a graduated thermostat set it to 19° or 20° C. (which are the generally recommended values). However, users of hot water heaters controlled by non-graduated taps are often satisfied with substantially lower temperatures, which do not provide the same "feel" of being cold as noted above.

SUMMARY OF THE INVENTION

An object of the present invention is to remedy the above disadvantages. A further object of the present invention is to produce electric radiators in which the temperature of the heat source does not vary substantially, and whose control is based on a percentage of the maximum power, rather than on the graduated value of the temperature. These devices can also be made considerably smaller than prior art devices, making it possible to house them in, for example, communicating doors.

The device is an optionally metallic enclosure which houses a heating body of a shielded resistance embedded in a light alloy metallic unit. The heating body is separated from the enclosure by stiffening elements, such that the metallic unit is fully surrounded by an air space. Control of the system is carried out by an electronic device that cuts power for a variable time period during a cycle of about four seconds, and displays a percentage of the maximum power.

BRIEF DESCRIPTION OF THE DRAWING

The following annexed schematic drawings provide non-limiting examples of embodiments of the object of the invention:

FIG. 1 is a vertical longitudinal cross-section of the heating body;

FIG. 2 is a front view of the control panel;

FIG. 3 is an elevational view of a communicating door equipped with a heating body according to the invention;

FIG. 4 is a vertical cross-section of the communicating door, along arrows IV—IV of FIG. 3; and FIG. 5 is a horizontal cross-section of the door, along arrows V—V of FIG. 3.

DETAILED DESCRIPTION OF THE INVENTION

The present invention, as shown in the figures of the drawing, includes an electric heating body 1 mounted via spacers within an enclosure 2 of metal or synthetic material. Spacers 7 define a space 3 between heating body 1 and enclosure 2, allowing for the passage of air. Even during continuous operation of the radiator at maximum power, the temperature in enclosure 2 cannot, under any circumstances, reach a dangerous level.

As shown in FIG. 1, heating body 1 includes a shielded resistive element 4 embedded by hot molding in a light alloy metallic unit 5. The volume of metallic unit 5 is calculated to ensure sufficient accumulation of thermal energy so that changes in temperature induced by the power cut-offs in the system control are not perceived within the heated environment.

The spacers can be, for example, stiffeners for a metallic enclosure 2, and/or tubular sections 7 (which can also serve as conduits for power supply cables).

Unlike prior art devices, the present invention controls temperature without a thermostat, and without reference to the ambient temperature. An electronic control box 8 includes circuits which periodically cut and restore the current according to a short cycle, e.g., four seconds. Depending on the respective cut-off and restoration periods, heating body 1 receives power ranging from 0 to 100% of the nominal power. The front surface of the box 8 includes an on-off button 9, and two push-buttons 10 and 11 which respectively progressively increase and reduce the length of the current restoration periods (and therefore the relative power). The value of the relative power, expressed by percentage, is displayed on a small LCD screen 12.

An application of the present invention in conjunction with heating communicating doors 13, which eliminates use of bulky radiators, is shown in FIGS. 3–5.

The heating door 13 includes heating body 1 as described above in the lower part of the door. Two vertical lateral plates 14 and side elements (e.g., of tubular sections 7) form an enclosure that allows air to circulate. Each side of the door 13 has bottom and top recessed elements 15 and 16 which open outwardly and allow the input and output, respectively, of air in the enclosure. The exterior aspect of recessed elements 15 and 16 is similar to that of decorative panels 17 mounted on the lateral plates 14. The control box 8 can be mounted on the frame 18. Electrical cables are wired in a known manner through a flexible sheath housed in a cavity provided in the vertical portion of the frame, on the hinge side 18.

The positioning of the various elements meets the objects of the invention with a maximum of useful effects which have not, to date, been obtained by other devices.

I claim:

1. An electric radiator comprising:

an enclosure;

a heating body, housed in said enclosure, said heating body including a shielded resistance element embedded in a light alloy metallic unit;

said heating body being separated from said enclosure by a plurality of spacers such that said metallic unit is surrounded by an air space; and a control box operative to periodically cut and restore power supply to said heating body for an adjustable time period, wherein said adjustable time period is independent of ambient temperature.

2. The electric radiator according to claim 1, wherein said enclosure is metallic, and at least one of said plurality of spacers is a stiffener.

3. The electric radiator according to claim 1, wherein said enclosure is metallic, and at least one of said plurality of spacers is a tubular section.

4. The electric radiator according to claim 1, wherein said enclosure is a synthetic material.

5. The electric radiator according to claim 1, wherein a front surface of said control box includes an on-off button, and two push-buttons which respectively progressively increase and reduce the length of said adjustable time period and a relative power, said relative power being expressed as a percentage displayed on a screen.

6. The electric radiator according to claim 1, further comprising a heating communicating door, said door including two vertical lateral plates and two side elements which form an enclosure to allow air to circulate about said heating body.

7. The electric radiator according to claim 6, further comprising:

bottom and top recessed elements, mounted on each side of said door, which allow the input and output of air, respectively; and an exterior view of said top and bottom recessed elements being similar to decorative panels mounted on said two lateral plates.

8. The electric radiator of claim 1, wherein said control box includes a device for inputting a power level, and said adjustable time period is derived from said power level as input.

9. The electric radiator of claim 8, wherein said control box establishes a repeating cycle having a duration separated into a first period in which power is supplied to said heating body and a second period in which power is cut from said heating body, said first period being equal to said adjustable time period, and said second period being a remainder of said duration.

10. The electric radiator of claim 1, wherein said control box includes a device for inputting a power level, said control box establishing a repeating cycle wherein said cycle includes a first time period in which power is supplied to said heating unit, said first time period being based on said power level as input, and a second time period during which power is cut from said heating unit.

11. The electric radiator of claim 10, wherein said first and second time periods remain fixed regardless of changes in ambient temperature.

12. An electric radiator comprising:

an enclosure;

a heating body, housed in said enclosure, said heating body including a shielded resistance element embedded in a metallic unit;

said heating body being separated from said enclosure by a plurality of spacers such that said metallic unit is surrounded by an air space; and a control box operative to periodically cut and restore power supply to said heating body for an adjustable time period, wherein said adjustable time period is independent of ambient temperature.

* * * * *